Patented Oct. 9, 1928.

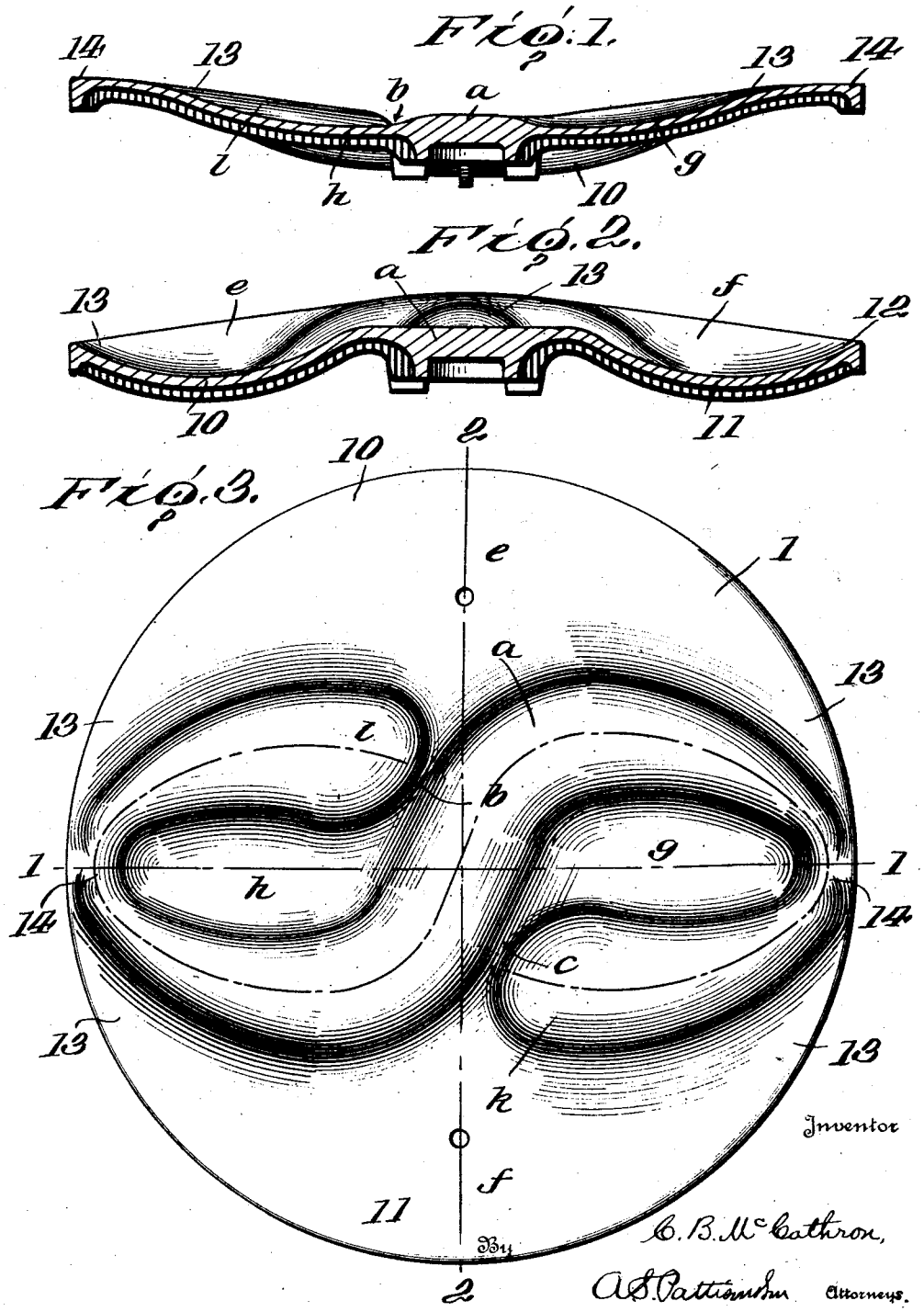

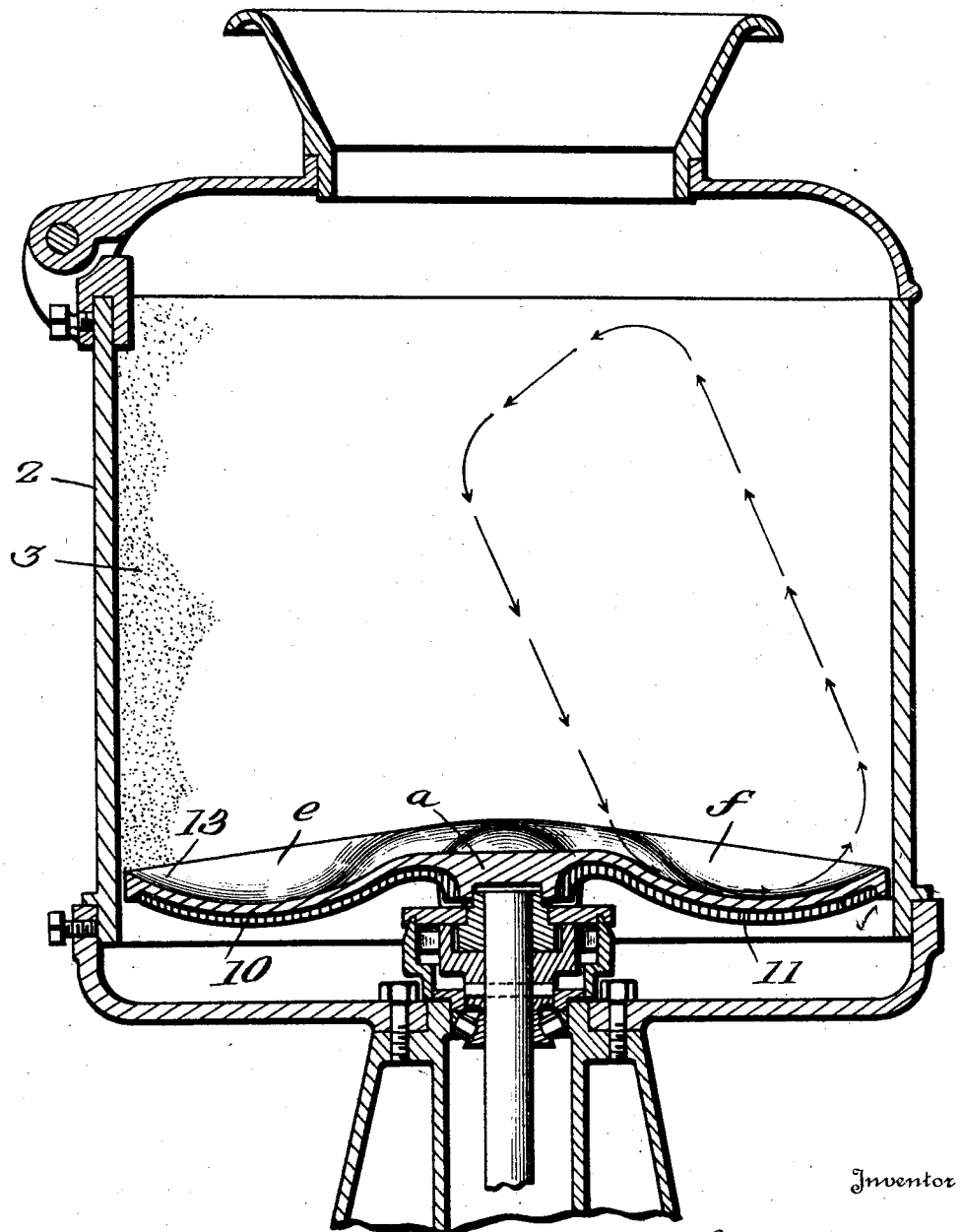

1,687,171

UNITED STATES PATENT OFFICE.

CLAUDE B. McCATHRON, OF ROCHESTER, NEW YORK, ASSIGNOR TO JOSIAH ANSTICE & CO. INC., OF ROCHESTER, NEW YORK.

VEGETABLE-PEELING MACHINE.

Application filed December 15, 1927. Serial No. 240,203.

My invention relates to improvements in vegetable peeling machines, being directed more particularly to the rotary peeling and supporting disc which forms the bottom of the container in which the vegetables are peeled.

In carrying out the present invention, the rotary peeling and supporting member forms a bottom of a container, the inner side of which is roughened as is likewise the surface of the supporting member. The vegetables are placed in the container and supported upon the abradant or roughened disc which is rotated to cause agitation of the vegetables for peeling them.

Vegetable peeling machines having a rotary peeling and supporting member are old in the art, but in so far as I am aware, there is room for vast improvement in the machines to bring them to a point of higher efficiency. In devices of this kind, the container is of a size to accommodate a bushel or more of vegetables, and consequently the vegetables at the bottom of the mass are under considerable weight, with the result that when the abradant disc is rotated, the vegetables at the bottom are ground away unless the entire mass of vegetables are agitated in a manner to cause a constant movement or circulation of the vegetables at the bottom of the mass towards the top. My improved disc is designed to cause a movement of the vegetables and in operation has proven that this movement approaches the point of perfect agitation, which is so much desired and so essential.

It is also essential that the peeling of the vegetables be accomplished in the quickest possible time and that the peeling of the vegetables be uniform. My improved disc in operation has proven that it lessens the time of the peeling and accomplishes a uniform peeling of all the vegetables in the machine.

By a long series of experiments I have found that to produce a disc which is efficient from the standpoint of peeling time, and uniformity of peeling, that the surface of the disc must be so shaped that when rotated a perfect agitation of the vegetables is obtained; that the vegetables tend to follow the irregular shape of the disc and that the vegetables are caused to move from the center of the disc towards the container sides. Upon reaching and coming in contact with the walls of the container the vegetables should have an upward movement and be carried to the top of the mass at the outer edges thereof, while the vegetables at the top of the mass should have a downward movement through the center of the mass towards the disc.

It is also highly desirable that the disc be so shaped as to operate when rotating in a clock-wise direction, or when rotated in a counter clock-wise direction.

From the foregoing it will be seen that it is essential to prevent the vegetables from forming into one mass upon the disc and traveling around the container, as such action causes the surface of the vegetables in contact with the cylinder to be ground flat and very much overpeeled, while the surfaces of the remaining vegetables which are not in contact with the walls of the container are insufficiently peeled.

The primary object of the present invention is the provision of an abradant disc for peeling machines, the surface of which has a novel form or shape to cause a perfect agitation of the articles being operated upon to bring about an efficient operation.

Another object of the invention is the provision of a rotary abradant disc for peeling machines, the operation of which is efficient when rotated in either a clock-wise or counter clock-wise direction.

Another and further object of the invention is the provision of an abradant disc for peeling machines the surface and contour of which is uneven, the higher portions of the surface being of a shape or configuration similar to a figure 8.

A further object of the invention is the provision of an abradant disc for peeling machines the surface or contour of which is such as to cause the articles being peeled to have an outward and upward turning and twisting movement from the bottom of the mass, while the vegetables at the top of the mass have an inward and downward movement.

Other objects, novel features of construction and improved results of the present invention will appear from the following specific description taken in conjunction with the accompanying drawings.

In the drawings:

Figure 1 is a vertical central or transverse sectional view on the line 1—1 Fig. 3.

Fig. 2 is a vertical central or transverse sectional view on the line 2—2 Fig. 3.

Fig. 3 is a top plan view of the improved disc.

Fig. 4 is a vertical central sectional view of the container of a peeling machine showing my improved disc therein.

Referring now to the drawings, my improved disc is designated by the numeral 1 and is shown as mounted within a container 2, the inner walls of which are covered by an abradant material 3. The upper surface of the disc 1 is likewise covered with an abradant. The disc is preferably made of cast-iron coated with carborundum which is cast into the metal to form a hard and durable abradant surface.

In operation the vegetables or the materials to be peeled are deposited in the container through the hopper top 4, and the abradant disc 1 has connection with a suitably driven shaft 5, through the medium of which the disc is rotated.

No specific description or form of peeling machine is given or illustrated, as my disc can be used with most any peeling machine now known or in common use.

The invention resides in the disc itself and by reference to the drawings it will be seen that the disc is made with a raised portion $a$, which is of a shape or configuration similar to a figure 8, with the slight exception of the broken away portions $b$ and $c$. This 8-shaped raised portion extends throughout one diameter of the disc, which is the height of the 8, while the width of the 8 is considerably less than the other diameter of the disc, thereby leaving the disc portions $e$ and $f$, which portions are depressed and curved to form a concave, as clearly apparent in Fig. 2 of the drawings where these depressed dish-shaped portions are designated by the numerals 10 and 11. The shape of the disc portions $e$ and $f$ is such as to form a lip 12, at the outer edge of the disc and this lip is continuous throughout the diameter of the disc, although it is not as pronounced at the points 13, where the portions $e$ and $f$ slope upwardly to meet the top and bottom of the 8-shaped raised portions. There is no lip whatsoever at the points 14, where the top and bottom of the 8-shaped raised portions meet the edge of the disc, the portions 14 are flat as appears in Fig. 1 of the drawings.

All of the edges or sides of the curves which form the 8-shaped raised portion are tapered downwardly to the adjacent surfaces of the disc as is clearly illustrated in the drawings and the disc portions $g$ and $h$ which lie within the loops of the 8 are of an approximate oval shape and depressed to form concave or dish like basins. By reference to Figs. 1 and 2 of the drawings, it will be seen that although the portions $g$ and $h$ are low spots in respect to the raised portion $a$, that $g$ and $h$ are in a plane above the lowermost portions $e$ and $f$ of the disc.

Attention is directed to the fact that the raised portion $a$ is materially reduced in width at the points 14 and that the width of the raised portions at these points increase gradually towards the ends $k$ and $l$ of the 8.

In so far as I am aware, the depressed portions $b$ and $c$ have no particular function. The ends $k$ and $l$ of the 8 are stopped short of the main cross-bar of the 8, so as to prevent a severe hump in the center of the disc, which would have occurred had the ends of the 8 been carried on and joined with the main cross-bar.

From a careful consideration of Fig. 3 of the drawings, it will be seen that the operation of the disc will be the same in the event it is rotated in either direction, for the reason that the same depressions and the same elevations will be presented to the vegetables irrespective of the direction of rotation.

In view of the foregoing remarks, it is not necessary to describe the operation of the machine and the resultant movement given the vegetables by the disc. It is very difficult to describe the exact agitation which takes place in the container. In Fig. 4 of the drawings, an attempt has been made to illustrate, by arrows, the movement of the vegetables in the container. From this it will be seen that the vegetables at the bottom of the mass resting upon the disc move outwardly towards the sides of the container and that the lip 12 of the disc causes these vegetables to move upwardly along the sides of the container. In actual practice, it has been found that the whirling mass of vegetables is broken up into an upward turning and twisting movement. The vegetables moving up the side of the container upon reaching the top of the mass are caused to move inwardly and downwardly at the center of the mass.

I have found by actual tests that a machine having a disc made in accordance with this invention has a greatly increased capacity over any discs now known to me, and that the movement or agitation of the vegetables caused by this disc is such that the character of the peeling is much more uniform and the loss in weight of the vegetables is consequently much less than in machines now used. Actual tests have also proven that the peeling time is materially reduced.

Although my discovery and invention is in nature specific, the results are such as to render the disc a vast improvement over the prior art and the claims should, therefore, receive the broadest possible construction consistent with the discs appearing in machines disclosed in the prior art.

Having thus described my invention, what I claim and desire to secure by Letters Patent is:

1. In a peeling machine, a rotary peeling and supporting member having an abradant surface, a portion of said surface raised, and said raised portion in the shape of a figure 8.

2. In a vegetable peeling machine, a rotary peeling and supporting member having an abradant surface, a portion of said surface raised and in the configuration of a figure 8, the top and bottom of said figure 8 terminating at the opposite edges of the member.

3. In a peeling machine, a rotary peeling and supporting member having an abradant surface, a portion of said surface raised, said raised portion of a configuration similar to a figure 8, and said raised portion of less width at the top, bottom, and center of said 8-shaped configuration than elsewhere.

4. In a vegetable peeling machine, a rotary peeling and supporting member having an abradant surface, a portion of said surface raised in a configuration similar to the figure 8, said raised portion of a length similar to the width of the supporting member and of a width materially less than the width of the supporting member, said supporting member adjacent the 8-shaped raised portion of a concave shape in cross-section, the portion of the supporting member within the loops of the figure 8 of a concaved shape in cross-section, and the surface of the supporting member within the loops in a plane above the plane of the surface of the supporting member adjacent the sides of the 8-shaped raised portion.

5. In a peeling machine, a rotary peeling and supporting disc having an abradant surface, a portion of said surface raised into an 8-shaped configuration, said raised portion extending throughout the diameter of the disc and terminating at the edges of the disc in a flattened portion, the surface of the disc at the sides of the raised portion of a concave shape in cross-section to provide an upturned lip around the entire perimeter of the disc with the exception of the flattened portion where the raised portion joins the edge of the disc, and the surface of the disc within the loops of the figure 8 depressed into a concave shape in cross-section.

6. In a peeling machine, a rotary peeling and supporting disc having an abradant surface, said disc surface depressed into a concave shape at opposite edges of the disc, an 8-shaped raised portion extending across said disc between said concaved shaped surface, and the surface of the disc in the loops of the 8 depressed below the surface of the raised portion but still in a plane above the plane of the concaved shaped portion at the opposite sides of the disc.

7. In a peeling machine, a rotary peeling and supporting member having an abradant surface, a portion of said surface raised, said raised portion of an 8-shaped configuration, and the ends of the loop terminating short of the cross-bar of the 8.

8. In a vegetable peeling machine, a rotary peeling and supporting member having an abradant surface, a portion of said surface raised, said raised portion of a configuration approximately similar to a figure 8, and the remaining surface of said disc formed into a series of depressions, whereby the disc presents alternately high and low spots for engagement with the vegetables when rotated.

In testimony whereof I hereunto affix my signature.

CLAUDE B. McCATHRON.